United States Patent
Orogvany et al.

(10) Patent No.: US 11,494,314 B2
(45) Date of Patent: Nov. 8, 2022

(54) CACHING SYSTEM FOR EVENTUALLY CONSISTENT SERVICES

(71) Applicant: Comcast Cable Communications, LLC, Philadelphia, PA (US)

(72) Inventors: Christopher Orogvany, Seattle, WA (US); Mark Perry, Seattle, WA (US); Bradley W. Jacobs, Edmonds, WA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/124,201

(22) Filed: Dec. 16, 2020

(65) Prior Publication Data

US 2021/0318964 A1    Oct. 14, 2021

Related U.S. Application Data

(63) Continuation of application No. 16/022,090, filed on Jun. 28, 2018, now Pat. No. 10,901,915.

(60) Provisional application No. 62/526,220, filed on Jun. 28, 2017.

(51) Int. Cl.
| | |
|---|---|
| *G06F 12/123* | (2016.01) |
| *G06F 3/06* | (2006.01) |
| *G06F 9/54* | (2006.01) |
| *G06F 16/23* | (2019.01) |
| *G06F 16/27* | (2019.01) |
| *G06F 12/126* | (2016.01) |

(52) U.S. Cl.
CPC .......... *G06F 12/123* (2013.01); *G06F 3/0604* (2013.01); *G06F 3/067* (2013.01); *G06F 3/0638* (2013.01); *G06F 3/0652* (2013.01); *G06F 9/54* (2013.01); *G06F 12/126* (2013.01); *G06F 16/23* (2019.01); *G06F 16/27* (2019.01)

(58) Field of Classification Search
CPC .... G06F 3/0604; G06F 3/0638; G06F 3/0652; G06F 3/067; G06F 9/54; G06F 12/123; G06F 12/126; G06F 16/23; G06F 16/27
See application file for complete search history.

(56) References Cited

U.S. PATENT DOCUMENTS

| | | |
|---|---|---|
| 6,449,695 B1 | 9/2002 | Bereznyi et al. |
| 8,108,608 B2 * | 1/2012 | Khemani .............. H04L 63/168 |
| | | 711/118 |
| 2011/0060778 A1 | 3/2011 | Dallari et al. |
| 2017/0371890 A1 | 12/2017 | Seker et al. |

* cited by examiner

*Primary Examiner* — Aracelis Ruiz
(74) *Attorney, Agent, or Firm* — Banner & Witcoff, Ltd.

(57) ABSTRACT

Systems, apparatuses, and methods may provide for an eventually-consistent distributed caching mechanism for database systems. As an example, the system may include a recently updated objects (RUO) manager, which may store object identifiers of recently updated objects and RUO time-to-live values of the object identifiers. As servers read objects from the cache or write objects into the cache, the servers may also check the RUO manager to determine if the object has been updated recently enough to be at risk of being stale or outdated. If so, the servers may invalidate the object stored at the cache as it may be stale, which results in eventual consistency across the distributed database system.

39 Claims, 6 Drawing Sheets

CACHING SYSTEM FOR EVENTUALLY CONSISTENT SERVICES

This application is a continuation of U.S. application Ser. No. 16/022,090, filed Jun. 28, 2018, which claims the benefit of U.S. Provisional Application 62/526,220, filed Jun. 28, 2017 and entitled "Caching System for Eventually Consistent Services." The above-referenced applications are incorporated herein by reference in their entirety.

BACKGROUND

A distributed database system may include multiple data centers with each data center including multiple databases and a cache. These data centers may be geographically separated from one another by large distances. In such a distributed database system, each of the databases may be copies (e.g., replicas) of one another and the system may be configured to propagate changes in one database to each of the other databases in the system. Similarly, in such a system, each of the caches (e.g., one cache for each data center) may be copies of one another and the system may also be configured to propagate changes in one cache to each of the other caches in the distributed databases system.

However, after an update to a database occurs, the distributed database system may become inconsistent and lead to storage of stale, outdated objects to be persistently stored at the caches of the distributed database system. After an update to an object is stored at one of the databases occurs, the object is removed from the caches of the distributed database system. Because the distributed database system takes some amount of time (e.g., a lag time) to distribute the updated object to the remaining databases in the distributed database system. If during this lag time and after the object has been removed from the caches, a stale version of the object is stored at one of the caches, then the stale version of the object may remain in the caches even after the updated object has been updated at all of the databases. Because devices requesting an object will first attempt to retrieve the object from the cache prior to retrieving the memory object from the databases, these devices will retrieve and use the stale version of the updated object. Having such stale, outdate versions of the object remaining in the caches and being used by devices can create a problem, and accordingly, there remains an ever-present need to efficiently manage the storage of content across the distributed database system.

SUMMARY

The following presents a simplified summary in order to provide a basic understanding of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Systems, apparatuses, and methods may provide for an eventually-consistent distributed database system. For instance, the system may include a list of object identifiers of objects that have been recently updated in the system (e.g., at one or more databases of the system). Other computing devices in the system (e.g., servers, caches, etc.) may use the list of object identifiers for recently updated objects to determine whether a particular object has been recently updated. If the particular object's identifier is on the list, the particular object may be potentially stale since the updated version of the object may not have finished propagating to each database of the distributed database system. Thus, if the object's identifier is on the list, these computing devices may remove the object from one or more caches of the system. Additionally, a computing device managing the list of object identifiers for recently updated objects may remove object identifiers of the list after their corresponding objects are no longer considered recently updated, which may be defined using time-to-live values stored in the list of object identifiers for recently updated objects. These time-to-live values of the object identifiers represent predicted times for updates to the objects to propagate across databases of the distributed database system. As a result of the removal of recently updated objects from the one or more caches, the caches may, after each of the databases of the system have been updated, eventually store the updated version of the object.

These features in the summary above are merely examples of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various example features, reference is made to the accompanying drawings identified above, which form a part hereof, and in which is shown by way of illustration examples in which features of the disclosure may be practiced. Other features may be utilized and structural and functional modifications may be made, without departing from the scope discussed herein. Various features are capable of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
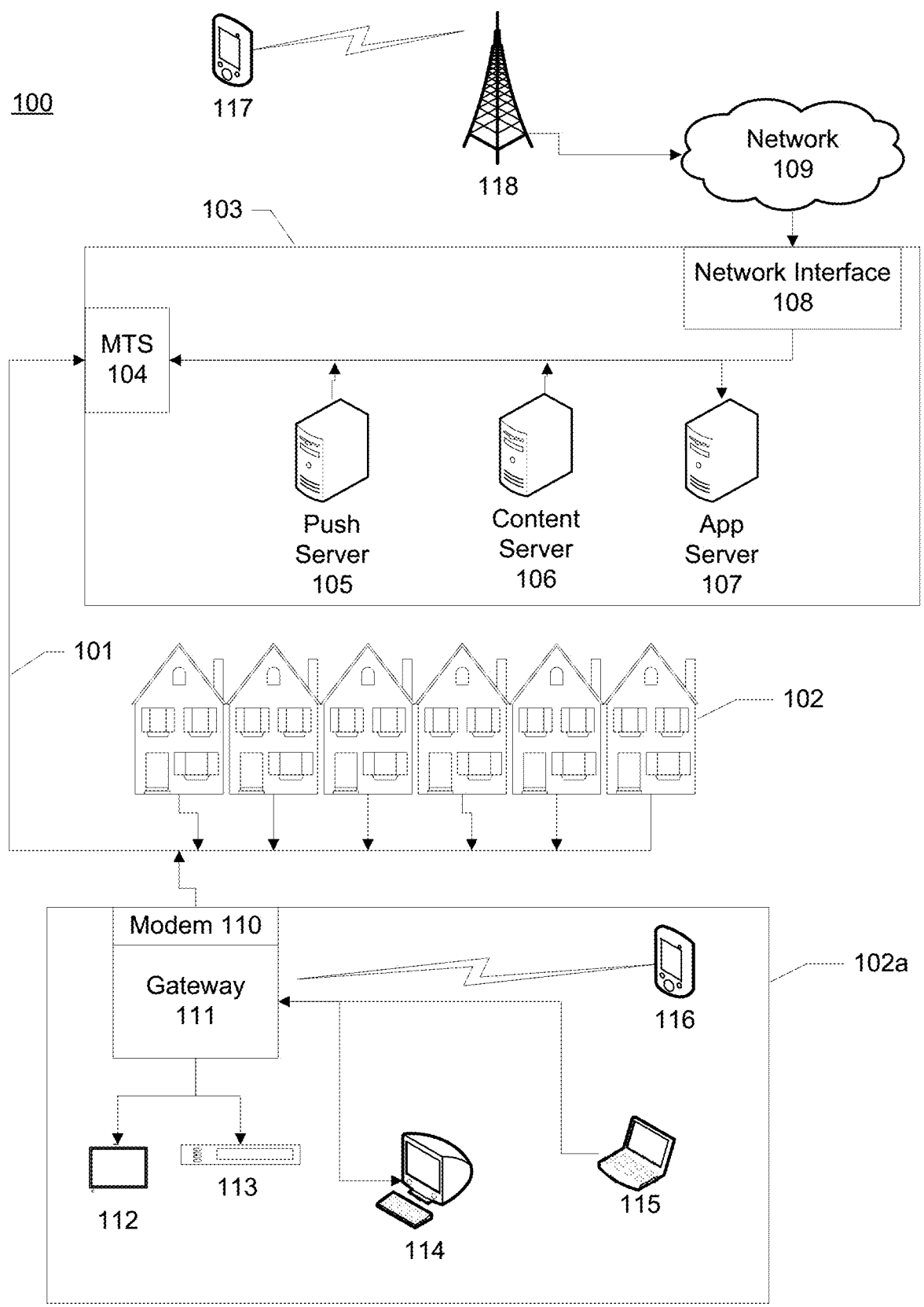
FIG. 1 depicts an example information access and distribution network.

FIG. 1 illustrates an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend). The local office 103 may transmit downstream information signals onto the communication links 101, and each of the premises 102 may have a receiver used to receive and process those signals.

One of the communication links 101 may originate from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly. Portions of the communication links 101 may also be implemented with fiber-optic cable, while other portions may be implemented with coaxial cable, other lines, or wireless communication paths. The communication links 101 may be coupled to a base station 118 configured to provide wireless communication channels to communicate with mobile device 117. The wireless communication channels may be Wi-Fi IEEE 802.11 channels, cellular channels (e.g., LTE), and/or satellite channels.

The local office 103 may include an interface 104, such as a termination system (TS). As an example, the interface 104 may be a cable modem termination system (CMTS), which may be a computing device configured to manage communications between devices on the network of the communication links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding mobile devices 117 (e.g., cell phones, smartphone, tablets with cellular radios, laptops communicatively coupled to cellular radios, etc.).

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102*a*, such as a home, may include an interface. The interface may include any communication circuitry needed to allow a device to communicate on one or more of the links 101 with other devices in the network. For example, the interface may include a modem 110, which may include transmitters and receivers used to communicate on the links 101 and with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface. Further, the interface may include a gateway interface device 111. The modem 110 may be connected to, or be a part of, the gateway interface device 111. The gateway interface device 111 may be a computing device that communicates with the modem(s) 110 to allow one or more other devices in the premises 102*a*, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
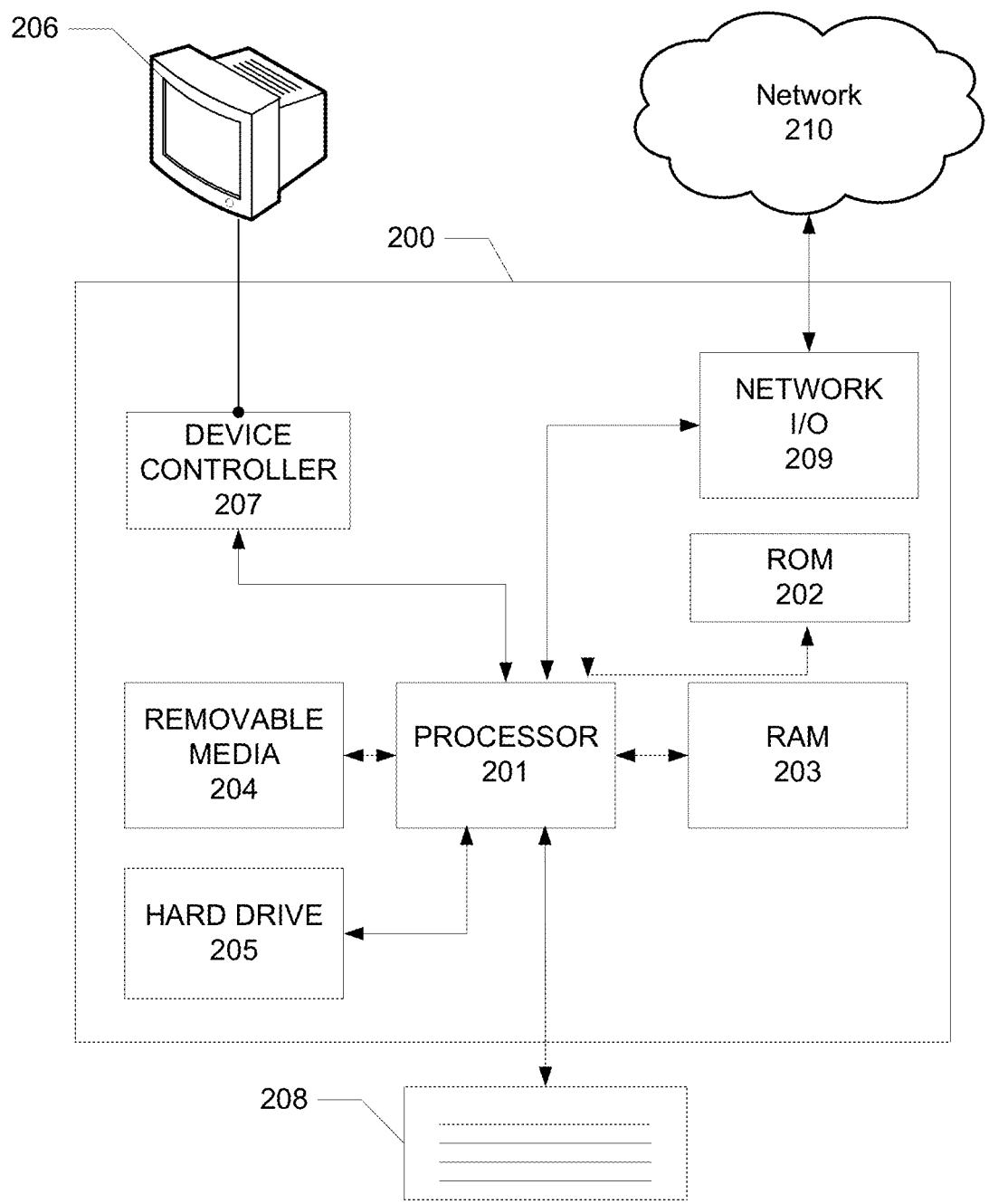
FIG. 2 depicts an example computing device that may be used to implement any of the features and devices described herein.

FIG. 2 illustrates general hardware elements that may be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some cases, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor (not shown), which may be configured to receive and process global positioning signals and determine, with possible assistance from an external server and antenna, a geographic position of the computing device 200.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity may be a separate software process and program from a dependent entity, both of which may be executed as software on a common computing device).

One or more features described herein may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Figure 3:
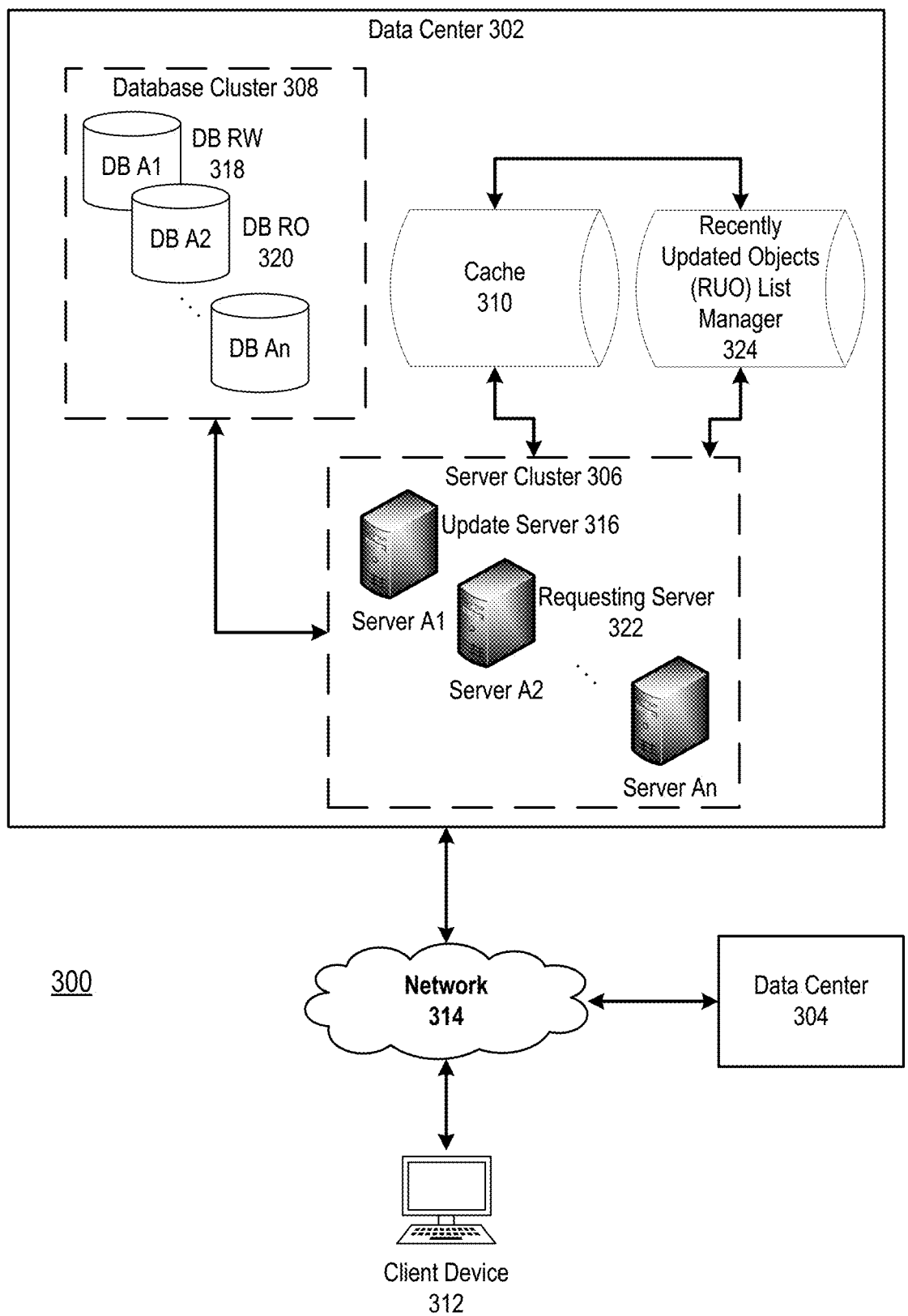
FIG. 3 depicts an example eventually-consistent distributed database system.

FIG. 3 depicts an example eventually-consistent distributed database system. For example, an eventually-consistent distributed database system may be any distributed database system in which multiple copies of the database content are stored at multiple different databases (e.g., computers, memories, etc.) and in which a change made to one copy of the content (e.g., an edit of a file at one database) will eventually (over time) be propagated to the other copies of the content at the other databases.

The distributed database system 300 may include multiple data centers (e.g., a data center 302, a data center 304, and so on). Each of the data centers may be located in in different geographic regions. For instance, the data center 302 may be located on the east coast of the United States (e.g., in Philadelphia) while the data center 304 may be located on the west coast of the United States (e.g., in Seattle). Yet other data centers (not shown) of the distributed database system may be located at even greater distances. For instance, one data center may be located in Europe and another data center may be located in Asia. Each data center may include the same devices, components, and functionality as other data centers described below.

Each data center may include its own server cluster, which may be responsible for providing services of the local office 103. As an example, the data center 302 may include a server cluster 306, which may include one or more servers (e.g., Server A1, Server A2, . . . Server An) that provide various services discussed herein. As an example, the servers may include one or more of the push notification server 105, the content server 106, and the application server 107 discussed above in connection with FIG. 1. Additionally, one or more of the servers may provide load balancing functionality for incoming requests. Each of the servers may communicate with other devices of the data center 302 (e.g., other servers of the data center 302) via a local area network and externally to other data centers (e.g., the data center 304) and client devices 312 (e.g., the gateway interface device 111 or a computing device communicatively coupled to the gateway interface device 111) via a wide area network 314. Each of the servers may include one or more of the components of computing device 200. For example, the servers may include one or more processor and memory storing computer-readable instructions that, when executed by the one or more processors, cause one or more of the servers to perform various functions of the servers described herein.

Each data center may include its own database cluster, which may be responsible for storage of objects (e.g., resources). As an example, the data center 302 may include a database cluster 308, which includes one or more databases (e.g., DB A1, DB A2, . . . DB An) that provide storage of each of the objects in the distributed databases system 300. An object may be a media content item such as, for example, a video, picture, audio recording, gaming content, social media service content, documents, articles, news, etc. The object may be a software application, plug-in, or other computer-executable instructions. The object may be a data item (e.g., statistical data) or metadata. One or more of the databases may be a relational database (e.g., a structure query language (SQL) database) or other type of database.

One or more of the servers of the server cluster 306 may place and retrieve objects from one or more of the databases of the database cluster 308. As an example, the servers may communicate with the databases via database command language such as SQL. As another example, the servers may use a file transfer protocol (FTP) to communicate with one or more of the databases in the database cluster 308. For instance, the servers may use GET and PUT commands. A GET command may be a command to retrieve the most recent version of an object specified in the GET command. For example, if a requesting server 322 (e.g., the server A2 in FIG. 3) sends a GET command to a particular database (e.g., the DB A1 in FIG. 3) to retrieve an object specified in the GET command. In response to the GET command, the particular database may return, to the requesting server, the most recent version of the object that is stored by that particular database. If the particular database does not have the object stored, then the particular database may return a "not found" or "invalid entry" response to the requesting server. A PUT command may be a command (e.g., a write instruction) to copy a local file to a remote computer using the current file transfer type.

One or more of the databases of a database cluster may include or be associated with replication or propagation functionality. As an example, each database cluster may include one master database and one or more slave databases. The master database may be a database configured to receive updates (e.g., write instructions) from an update server (e.g., update server 316), which may be one of the servers in the same data center or another server. In the database cluster 308, the master database may be a read/write (RW) database (e.g., the database RW 318) and may be configured to cause propagation and/or replication of its stored objects to each of the slave databases (e.g., the database RO 320). The master database may cause replication by sending a PUT command with the updated or new object to each of the slave databases based on a stored list of addresses of the slave databases in the data center 302. As a result, each of the slave databases may be a replica of the master database. For instance, if an object stored by the database RW 318 is updated and/or a new object is added to that database, the database RW 318 may immediately send a request to replicate (e.g., a PUT command) the updated or new object to each of the other databases of the database cluster (e.g., the database RO 320).

Further, each of the slave databases (e.g., the database RO 320) may be read-only (RO) databases, which may be a database that is only updated via propagation of updates occurring at the master database. In addition to sending the updated or new object to each of the slave databases of the data center 302, the master database RW 318 may cause replication of the updated or new object in each master database of other data centers (e.g., the data center 304) based on a stored list of addresses of the master databases. For example, the master database RW 318 may send a PUT command with the updated or new object to each address of the other master databases. The master databases may, in turn, cause replication to each of their corresponding slave databases of the other data centers for example by sending a PUT command with the updated or new object to each address of their corresponding slave databases. As a result, after a period of time (e.g., a lag time), each of the databases in the distributed database system 300 may be updated to include the updated or new object.

Each of the databases may include the components and functionalities of the computing device 200. For example, each database may include one or more processors, communication interfaces, and memory storing instructions that, when executed by the one or more processors, cause the database to perform database function described herein.

Each data center may include its own cache (e.g., partitioned memory of a data center), which may be responsible for storage of objects recently read by the servers. Objects may be retrieved quicker from the cache than from a database as a result of the cache storing a subset of the objects stored by the databases (e.g., the cache may only store those objects that have been recently read by the servers). As an example, in data center 302, as servers of the server cluster 306 read objects from databases of the database cluster 308, the servers may also send a copy of these objects to a cache 310 for quick subsequent retrieval by each of the servers of the server cluster 306.

Each of the caches may include the components and functionalities of computing device 200. For example, each cache may include one or more processors, communication interfaces, and memory storing instructions that, when executed by the one or more processors, cause the cache to perform various cache functions described herein. In some cases, each data center may have a single cache. In other cases, each data center may include multiple caches.

Because an object may be more quickly retrieved from a data center's cache than from the data center's databases, the data center's servers may be configured to attempt to read the object from the data center's cache prior to reading an object from a database of the data center. As an example, a server (e.g., a requesting server 322) may receive a request for an object (e.g., a video) from a client device 312. In response to receiving the request for the object, the requesting server 322 may send a read request (e.g., a GET command) for the object to the cache 310. The cache 310 may determine whether a copy of the object is stored by the cache 310. If so, the cache 310 may send the object to the requesting server 322, which the requesting server 322 may then forward to the client device 312 to service the client device's 312 request. In such instance, the requesting server 322 might not send a read request for the object to any of the databases of the database cluster 308.

Otherwise, if the cache 310 determines that a copy of the object is not stored by the cache 310, the cache 310 may send, to the requesting server 322 a "Not Found" message indicating that the object is not stored by the cache 310. In response to receiving the "Not Found" message, the requesting server 322 may send a read request for the object to one or more of databases in the database cluster 308. The particular database that handles the request may be determined based on load balancing functionality performed by a server of the server cluster 306. After retrieving the object from one of the databases, the requesting server 322 may forward the object to the client device 312 and may also send a copy of the object (e.g., a PUT command) to the cache 310 for storage and retrieval.

Each of the caches of the distributed database system 300 (e.g., one for each data center) may include propagation or replication functionality. For instance, upon an object being stored by one of the caches in the distributed database system 300, that cache may cause replication (e.g., by using PUT commands and a stored list of addresses of the caches) in each of the other caches in the distributed database system 300. As an example, upon receiving a new object for storage, the cache 310 may send a PUT command containing a copy of the new object to the cache of data center 304. As a result, after a period of time (e.g., a lag time), each of the caches in the distributed database system 300 may be updated to include the object.

Each data center may include its own recently updated object (RUO) manager, which may be responsible for storing, updating, and managing a list of object identifiers of objects that have been updated recently enough in the distributed database system 300 that the propagation of the updated object to each of the databases in the distributed system 300 is likely or predicted to be still in progress. As a result, there is a risk that some copies of these objects stored in some caches and some databases of the distributed database system 300 may be a stale, outdated version of the object. After a client device requests a copy of an object, computing devices (e.g., requesting servers) of the distributed database system 300 may consult the RUO manager to determine whether the requested object was updated recently enough such that some cached copies of the requested object may be stale, and for such at-risk objects, the distributed database system 300 may remove the objects at risk of being stale from the caches of the distributed database system 300.

Each of the RUO managers may include the same components and functionalities as the computing device 200. For example, each RUO manager may include one or more processors, communication interfaces, and memory storing instructions that, when executed by the one or more processors, cause the RUO manager to perform various RUO functions described herein.

After an object in a master database is updated, the master database may notify the RUO manager of the same data center that the object has been updated. The notification may include the object identifier of the object that has just been updated and a RUO time-to-live (TTL) value, which may be generated by the update server and defines how long (e.g., a duration) that object is to be considered recently updated by the distributed database system 300. The RUO TTL value may be based on an amount of time the distributed system 300 may take to update all of its databases so that each of the databases may store the updated object. As an example, the RUO TTL value may be a time equal to a predicted minimum amount of time sufficient for the updated object to be replicated across each of the databases and/or caches of the distributed databases system 300 (e.g., a lag time). After the object identifier has been identified in the list of object identifiers for recently updated objects for a time period longer than its corresponding RUO TTL value (e.g., after the object identifier's RUO TTL expires), the RUO manager may remove that object identifier and its corresponding RUO TTL value from the list of object identifiers for recently updated objects since the object of may no longer be considered recently updated. That is, after the RUO TTL expires, the propagation of the associated updated object across all databases of the distributed database system 300 has been completed or predicted to be completed.

In one example, the data center 302 may include a RUO manager 324, which may store a list of object identifiers for objects that have been recently updated in the distributed database system 300 and a linked corresponding set of RUO TTL values that define whether the associated objects have been updated recently enough that there is a risk of some copies of the object stored in the distributed database system 300 of being stale. For instance, if an object in master databases RW 318 is updated by the update server 316, the update server 316 may send, to the RUO manager 324, a notification that the object has been updated and should be added to the list of object identifiers of objects that have been recently updated. The notification may include the object identifier and a corresponding RUO TTL value. In some cases, the notification may be in the form of a PUT command. The object may be added to the list since there is a risk of some copies of the object stored by the distributed databases system 300 of being stale (e.g., the propagation of the updated object across the databases of the distributed database system 300 may still be in progress). After the RUO TTL expires, the RUO manager 324 may remove the object identifier from the list since the object is no longer considered to be recently updated (e.g., the propagation of the updated object across the databases of the distributed database system 300 may be complete). For instance, after the RUO TTL expires, each database of the distributed database system 300 may include the updated object.

As noted above, the update server 316 may generate the RUO TTL value defining the time the distributed databases system 300 may take to propagate the updated object to each of its databases. In some cases, the RUO TTL value may the same for each recently updated object. In other cases, each recently updated object may be assigned its own RUO TTL value, which may be different from other RUO TTL values for other recently updated objects. In some instances, the RUO TTL value may be preset (e.g., 30 seconds, 2 minutes, 5 minutes, less than 15 minutes, etc.). In other instances, the update server 316 may dynamically determine the RUO TTL value for an object based on one or a combination of factors to predict the lag time for the updated object to propagate to each (e.g., all) of the databases of the distributed database system 300. One factor may be based on the current time taken for other updates to propagate across the databases or values caches as this time may be indicative of the time the distributed database system 300 may take to propagate an updated object to each database. For instance, the distributed database system 300 may include replication delay monitors at each database and/or cache, which may report, back to the update server 316, timestamps of when that database or cache received an update. The update server 316 may then use the time at which it updated the master database RW 318 and the latest time received by the databases and caches to determine the lag time. Another factor may be the size of the updated object, which may also be reported back to the update server 316 by the replication delay monitors. Updated objects having a larger size may take longer to replicate across the distributed database system 300. Yet another factor may be the current available bandwidth of a local and/or external network since a lower available bandwidth may result in a longer lag time to propagate the updated object across the distributed database system 300. Still yet another factor may be the geographic distance between data centers as a greater distance may also result in a longer lag time to propagate the updated object across the distributed database system 300.

Yet another factor may be an agreed-upon RUO TTL value for a particular source of the object, which may be a social networking source, another media service source, etc. For example, in instances where the distributed database system 300 is extended to social media networking sources, such sources may instruct the RUO manager 324 to use a particular RUO TTL, which also may be based on one or more of the above-described factors for the source's own system.

In some cases, the update server 316 may dynamically update the RUO TTL values stored in the RUO manager 324 based on changes associated with the one or more above-described factors. As an example, if the available bandwidth in the local or external networks decreases, the distributed database system 300 may now take a longer amount of time than previously anticipated to propagate a recently updated object to each database. The update server 316 may monitor the local and remote networks for changes in available bandwidth. If the available bandwidth in the local or external networks decreases, the update server 316 may increase the RUO TTL values stored in list of the RUO manager 324 to account for the increase in lag time to propagate updates to each of the databases. As another example, if the available bandwidth in the local or external networks increases, the distributed database system 300 may now take a shorter amount of time than previously anticipated to propagate a recently updated object to each database and, thus, the update server 316 may decrease the RUO TTL values stored in list of the RUO manager 324 to account for the decrease in lag time to propagate updates to each of the databases. The updated RUO TTLs may be propagated to the other RUO managers of the distributed database system 300.

As discussed above, computing devices (e.g., the requesting server 322, the cache 310) may consult the RUO manager 324 to determine whether a particular object has been updated recently enough such that some cached copies of the object may be stale, and for such at-risk objects, the distributed database system 300 may remove (e.g., invalidate) the objects at risk of being stale from the caches (e.g., the cache 310) of the distributed database system 300.

During a time period defined by a RUO TTL in which the distributed database system 300 may still be in progress of propagating an updated object to each of its databases, these computing devices (e.g., the requesting server 322, the cache 310) may consult the RUO manager 324 for objects being read and/or otherwise used by the computing devices. If the object's object identifier is identified in the list of object identifiers for recently updated objects (e.g., the object has been updated and its corresponding RUO TTL has not expired), the computing devices may remove (e.g., invalidate) the object corresponding to the RUO TTL value from the cache 310 since the object stored in the cache 310 may be stale.

In one example, after a requesting server 322 reads an object from a database, the requesting server 322 may store the object in the cache 310 to permit itself and other servers to obtain a copy of the object from the cache 310 rather than from the databases. As noted above, objects may be more quickly retrieved from the cache 310 than from the database since the cache 310 includes only a subset of the objects stored by the databases. In storing the object at the cache 310, the requesting server 322 may determine a TTL value indicating how long to store the object in the cache 310, which may be different than a corresponding RUO TTL for the object. The requesting server 322 may send, to the cache 310, a PUT command including the object, the object's identifier, and the corresponding TTL value. In response, the cache 310 may store the object, the object's identifier, and the corresponding TTL value.

If the object has been recently updated at one of the databases of the distributed database system 300 and, as a result, the object's object identifier and its RUO TTL value may have been added to the list of object identifiers for recently updated objects maintained by the RUO manager 324. The requesting server 322 may be unaware that the object has been recently updated and, as a result, may have potentially stored a stale, outdated version of the object at the cache 310. Thus, the requesting server 322 may be configured to consult with the RUO manager 324 after storing the object at the cache 310 to determine whether the object is at risk of being stale. For instance, the requesting server 322 may, after storing the object in the cache 310, send, to the RUO manager 324, a request for an indication of whether the object has been updated recently enough that there is a risk of the object being stale as a result of the updated object still being propagated across the distributed database system 300 (which is based on the RUO TTL value). For instance, the request may include the object's object identifier and a query for whether the object's object identifier is listed in the list of object identifiers for recently updated objects.

The object identifier may be included in the list of object identifiers for recently updated objects if the object was recently updated and its RUO TTL has not yet expired. An object having its object identifier included in the list may be at risk of being stale because the predicted time for the updated version of the object to propagate to each database of the distributed database system 300 has not been complete. Thus, the requesting server 322 may have previously read a stale version of the object from the database, which the requesting server 322 then stored in the cache 310. If the object identifier is listed in the RUO manager 324, the RUO manager 324 may send, to the requesting server 322, a response indicating that the object has been updated recently enough to be at risk of being stale since its RUO TTL has not expired. For example, the response may include object identifier and an indication that the object identifier is identified in the list of object identifiers for recently updated objects.

Because the object's identifier is identified in the list, the requesting server 322 may determine that there is a risk that the object the requesting server 322 just stored at the cache 310 may be a stale version of the object. While the requesting server 322 might not be able to determine that the object the requesting server 322 stored at the cache 310 is stale (since there might not be versioning information for the object), the requesting server 322 may be configured to enforce a "safe not sorry" approach by removing any potentially stale objects from the cache 310. That is, in response to receiving, from the RUO manager 324, the response indicating that the object has been updated recently enough to be at risk of being stale, the requesting server 322 may send, to the cache 310, an invalidation command (e.g., an instruction) to remove the object from the cache 310. In some instances, the removed object may have been stale. In other instances, the removed object might not have been stale. Rather, the removed object may have been an updated version of the object. Accordingly, objects at risk of being stale may be removed from the cache 310.

If the object has not been updated recently enough to be at risk of being stale, then the object's identifier might not be in the list of object identifiers for recently updated objects maintained by the RUO manager 324 since propagation of the updated version of the object across each database of the distributed database system 300 is predicted to be complete. Thus, the RUO manager 324 may send, to the requesting server 322, a response indicating that the object has not been updated recently enough to be at risk of being stale since its RUO TTL has expired. For example, the object's RUO TTL value may no longer exist (since it was deleted or has a null value). The response may include the object identifier and an indication that the object identifier is not identified in the list of object identifiers for recently updated objects.

In response to receiving a response indication that the object has not been updated recently enough to be at risk of being stale, the requesting server 322 may maintain storage of the object in the cache 310 (e.g., the requesting server might not send the invalidation command to invalidate the object). An object might not be listed in the RUO manager 324 if the object has never been updated or if the object has been updated but its corresponding RUO TTL value has expired, in which case the RUO manager 324 may have removed the corresponding object identifier and the RUO TTL value from the list since the object is no longer considered recently updated.

While the above example relates to after the requesting server 322 wrote the object to (e.g., stored the object at) the cache 310, in another example, the requesting server 322 may be configured to consult the RUO manager 324 after reading a copy of the object from the cache 310 to verify that the requesting server 322 is not obtaining a stale version of the object. For instance, the requesting server 322 may, after reading an object from the cache 310 (which may be associated with a TTL value indicating how long the object is to be stored by the cache 310), send, to the RUO manager 324, a request for an indication of whether the retrieved object has been updated recently enough to be at risk of being stale, which may be based on its RUO TTL value. The request may include the object's identifier. The RUO manager 324 may determine whether the received object identifier is listed its list of object identifiers. If so, the RUO manager 324 may send, to the requesting server 322, a response indicating that the object has been updated recently enough to be at risk of being stale, which may be based on its RUO TTL not yet being expired. In response, the requesting server 322 may, send, to the cache 310, an invalidation command (e.g., an instruction) to remove the object from the cache 310.

Otherwise, if the object's identifier is not listed by the RUO manager 324 since the RUO TTL's has expired, the RUO manager 324 may send, to the requesting server 322, a response indicating that the object has not been updated recently enough to be at risk of being stale. For instance, the object's RUO TTL value may no longer exist (since it was deleted or has a null value). Thus, the requesting server 322 may maintain storage of the object in the cache 310 (e.g., the requesting server might not send the invalidation command to invalidate the object).

The RUO TTL value for a particular object may be different from the TTL for the particular object 324 in the cache 310. As discussed above, the RUO TTL value may indicate how long to store the object's identifier in the list of object identifiers for recently updated objects maintained by the RUO manager 324. The RUO TTL defines a time period during which copies of the particular object may be at risk of being stale. The time period may be the predicted amount time for the updated object to propagate across each database of the distributed database system 300. While the RUO TTL has not expired, the distributed database system 300 may invalidate the particular object in the cache 310. After the RUO TTL expires, the object's identifier is removed from the list of object identifiers for recently updated objects and the object might no longer be invalidated in the cache 310. The TTL value for the particular object, which may be stored by the cache 310, may indicate how long to store the particular object at the cache 310. While the TTL value for the particular object has not yet expired, the object may remain in the cache 310. After the TTL value for the particular object expires, the object may be removed from the cache 310.

The RUO TTL may define a shorter time period than the TTL value for the particular object. The RUO TTL for the particular object may define the amount of time for the updated object to propagate to each database, which may take 2 minutes, 5 minutes, 10 minutes, less than 15 minutes, etc. The TTL value for the particular object in the cache 310 define the amount time the object the requesting server 322 wishes to store the object in the cache 310 for quick access. This TTL value may be at least a day, at least two weeks, a month, a year, indefinitely, etc.

While the RUO manager 324 is shown as a separate component from the cache 310, in some cases, the RUO manager 324 may be part of the cache 310. In some cases, the object identifiers listed in the RUO manager 324 may be in the form of a hash table. In some cases, the RUO manager 324 may prevent/block storage, at the RUO manager 324, of the objects themselves or the TTL values of those objects that are to be used with the cache 310. In some cases, the RUO manager 324 may be representative of a list of recent write commands to the master databases.

Each of the RUO managers of the distributed database system 300 (e.g., one for each data center) may include propagation or replication functionality. As an example, upon an object being updated in the master database RW 318, the update server 316 may send, to the RUO manager 324, a notification that the object has been recently updated. The notification may include the object identifier of the recently updated object and its RUO TTL. Additionally, upon such storage, the RUO manager 324 may begin propagation of the update notification to each of the other RUO managers of the other data centers, which may be based on its stored list of addresses of other RUO managers. As an example, the RUO manager 324 may send, to each of the other RUO managers, a notification (e.g., a PUT command) including the object identifier and the RUO TTL value for the updated object. After some propagation delay, each (e.g., all) of the RUO managers may store the same updated list of object identifiers of recently updated objects and their corresponding RUO TTL values. Because the object identifier and corresponding RUO TTL value may have a much smaller size than the updated object and because there may be only one RUO manager per data center, the propagation of update notifications to the RUO managers may occur much quicker than the update of the object to the databases. In some cases, each data center may include multiple RUO managers.

A RUO manager (e.g., the RUO manager 324) and its local cache (e.g., the cache 310) may communicate with one another in order for RUO managers to invalidate objects in the caches and for the caches to consult the RUO managers regarding whether a particular object may be at risk of being stale. As an example, in addition to the requesting server 322 being configured to invalidate objects at the cache 310, the RUO manager 324 may also be configured to invalidate objects at the cache 310. For instance, the RUO manager 324 may receive an update notification from another RUO manager (e.g., a RUO manager of the data center 304). The update notification may be a PUT command and include the object identifier and its RUO TTL value for the recently updated object. In response to receiving the update notification, the RUO manager 324 may send, to its local cache (e.g., the cache 310), an invalidation command (e.g., an instruction) to remove the corresponding object from the cache 310 since the copy of the object stored by the cache 310 may be at risk of being stale.

As another example and as discussed above, as one cache of the distributed database system 300 receives and stores an object, the cache may begin sending, to caches of other data centers, copies of the object, the object's identifier, and its TTL value indicating how long to store the object in the caches. For instance, the cache 310 may receive an object for storage and its TTL value from a cache of the data center 304. In response, the cache 310 may store the object, the object's identifier, and its TTL value. Additionally, the cache 310 may send, to the RUO manager 324, a request for an indication whether the object has been updated recently enough to be at risk of being stale. The request may include the object identifier. If so, the cache 310 may remove the object from itself. Otherwise, the cache 310 maintain storage of the object.

Figure 4:
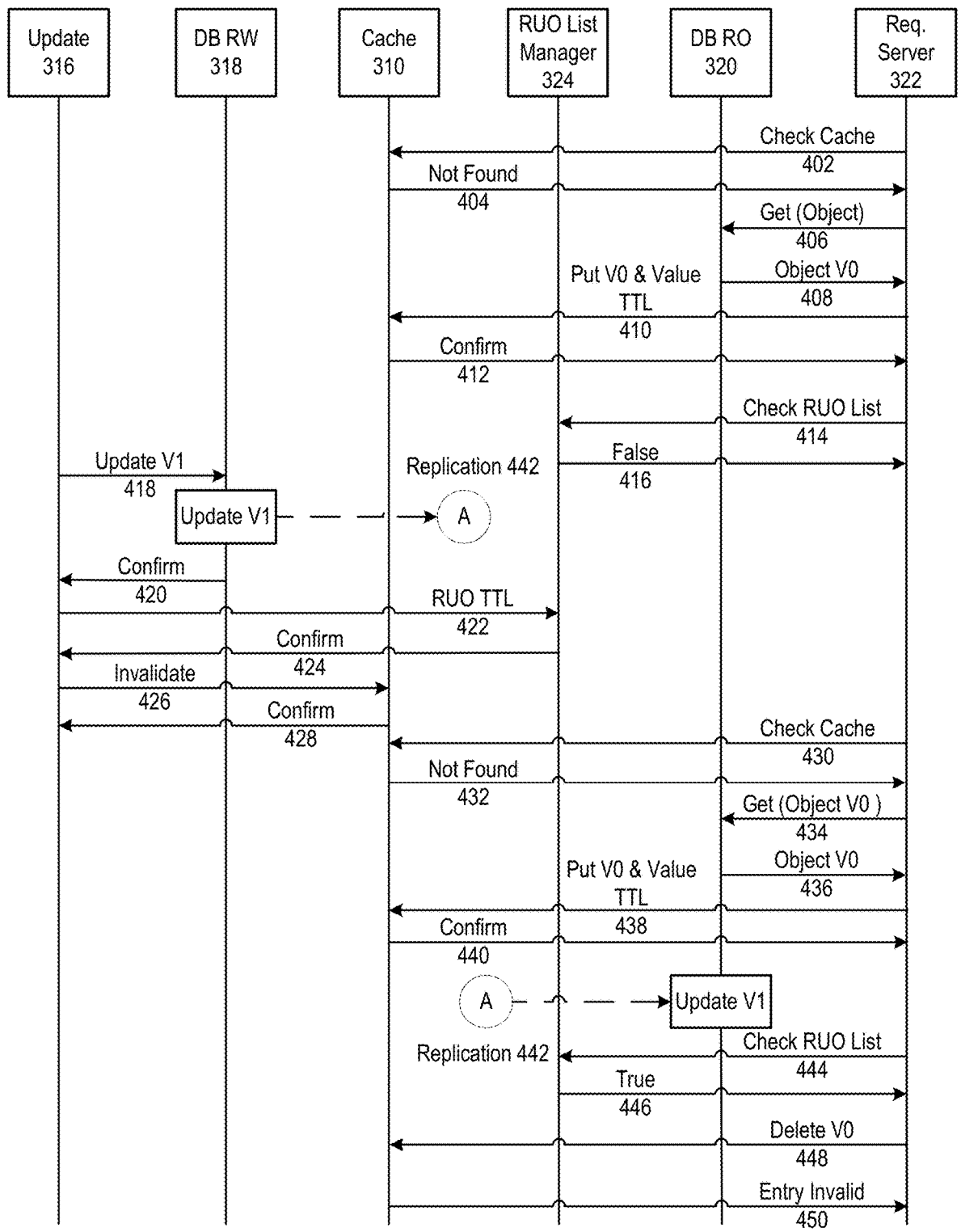
FIG. 4 depicts an example message flow for an eventually-consistent distributed database system.

Turning now to FIG. 4, which depicts an example message flow for an eventually-consistent distributed database system. In some cases, the steps of FIG. 4 may be performed in response to the requesting server 322 receiving a request for an object from the client device 312.

As discussed above, the servers of the server cluster may be configured to, prior to retrieving an object from the database cluster, attempt to retrieve the object from the cache of the same data center since retrieving the object from the cache may be quicker than retrieving the object from the database cluster. Thus, at step 402, the requesting server 322 may check whether the object is stored by the cache 310 of the data center 302. For instance, the requesting server 322 may send a GET command with the object's identifier to the cache 310. In response, the cache 310 may check its memory to determine whether the cache 310 has a stored copy of the object. If so, the cache 310 may return, to the requesting server 322, a copy of the most recent version of the object stored by the cache 310. In such cases, the requesting server 322 may service the client device's 312 request for example by forwarding the object to the client device 312.

Otherwise, if the cache 310 determines that the object is not stored by the cache 310, then the cache 310 may, at step 404, return, to the requesting server 322, an indication that the object is not stored by the cache 310. As an example, the cache 310 may return a "Not Found" message indicating that the object has not been found by the cache 310. The "Not Found" message may include the object's identifier. In response to receiving the indication that the object is not stored by the cache 310 (e.g., a "Not Found" message), the requesting server 322 may, at step 406, send a request for the object to one or more databases of the database cluster 308. In the example of FIG. 4, the request may be a GET command to retrieve the object as shown in step 406. The GET command may include the object's identifier. The database that receives the GET command may be determined based on load balancing performed by a device of the distributed database system 300 (e.g., such as another server). In this example, the database RO 320 receives the GET command from the requesting server 322. In response, the database RO 320 may look up the latest version of the object in its memory and return the latest version of the object to the requesting server 322 at step 408. In this instance, the latest version of the object stored by the database RO 320 may be version 0. After the requesting server 322 receives the object, the requesting server 322 may, at step 410, assign the object a time-to-live (TTL) value indicating how long to store the object at the cache 310 and may store the object along with the TTL value at the cache 310. For example, the requesting server 322 may send, to the cache 310, a PUT command with the object, the object's identifier, and its assigned TTL. The cache 310 may be configured to remove the object from the cache 310 after a time period defined by the assigned TTL value has expired. The TTL value may be for example 2 weeks, a month, a year, etc.

The cache 310 may, at step 412, return a confirmation of the storage to the requesting server 322. At this point, version 0 of the object is stored by each of the database RO 320, the cache 310, and the requesting server 322. At this point, the requesting server 322 may also service the client device's 312 request for example by forwarding the object to the client device 312.

At step 414, the requesting server 322 may be configured to, after storing an object in the cache 310 (e.g., after sending a PUT command to the cache 310), check the RUO manager 324 to determine whether the object has been updated recently enough to be at risk of being stale. As an example, the requesting server 322 may send, to the RUO manager 324, a request for an indication of whether the object has been updated recently enough that there is a risk of the object being stale as a result of the updated object still being propagated across the distributed database system 300 (which is based on the object's RUO TTL value). For instance, the request may include the object's object identifier and a query for whether the object's object identifier is listed in the list of object identifiers for recently updated objects.

The RUO manager 324 may determine whether the object identifier matches any of the object identifiers listed in the RUO manager 324. If so, the RUO manager 324 may send, to the requesting server 322, a response indicating that the object has been updated recently enough to be at risk of being stale, which may be based on the object's RUO TTL value. The response may include the object identifier and an indication that the object identifier is included in the list of object identifiers for recently updated objects and, thus, should be invalidated in the cache 310 since the object may be stale. As an example, the RUO manager 324 may return a "True" message. Otherwise, if the object identifier does not match any object identifier listed in the RUO manager 324, the RUO manager 324 may send, to the requesting server 322, a response indicating that the object has not been updated recently enough to be at risk of being stale, which may be based on the object's RUO TTL value having a null value or not existing. The response may include the object identifier and an indication that the object identifier is not included in the list of object identifiers for recently updated objects and, thus, the object might not be invalidated in the cache 310 since the object is not stale. As an example, the RUO manager 324 may return a "False" message as shown in step 416.

At some later time, the update server 316 may, at step 418, send an update of the object to the database RW 318. In response, the database RW 318 may apply the update to produce version 1 of the object. In some instances, the update may replace version 0 of the object currently stored by the database RW 318 with version 1 of the object. In other instances, the update may append or modify version 0 of the object currently stored by the database RW 318 to produce version 1 of the object. The database RW 318 may, at step 420, send a confirmation that the update was successful to the update server 316. Additionally, the database RW 318 may, at step 442, begin propagation (e.g., replication) of the update by sending the updated object to its corresponding slave databases and to master databases of other data centers (e.g., data center 304), which may, in turn, send the update to their corresponding slave databases.

After successfully updating the object in the database RW 318, the update server 316 may, at step 422, determine a RUO TTL value for the recently updated object (based on a predicted lag time to propagate the update across the system) and send, to the RUO manager 324, an object identifier of the recently updated object and the determined RUO TTL value, for storage. As discussed above, the RUO manager 324 may maintain a list of object identifiers of objects updated recently enough to be at risk of being stale, which the requesting server 322 or the cache 310 may check to determine whether to invalidate an object at the cache 310. If the object's identifier is listed by the RUO manager 324, the object may be removed from the cache 310. If the object's object identifier is not listed in the RUO manager 324, the object might not be removed from the cache 310 on this basis but the object may be removed after its TTL for storage in the cache 310 expires. Additionally, the RUO manager 324 may be configured to remove an object identifier from the list of object identifiers stored in the RUO manager 324 after its RUO TTL expires.

After the RUO TTL and the object identifier of the recently updated object have been stored in the RUO manager 324, the RUO manager 324 may, at step 424, send a successful storage confirmation back to the update server 316. In some cases, the confirmation may include the object identifier.

After receiving the successful storage confirmation, the update server 316 may, at step 426, invalidate the object stored at the cache 310 since version 0 is now stale. For example, the update server 316 may send, to the cache 310, a command to invalidate the object at the cache 310. The command may be an instruction to remove the object from the cache 310 and may include an identifier of the object. Invalidation may include removing and/or otherwise deleting the object from the cache 310. After the cache 310 has invalidated the object, the cache 310 may, at step 428, send an invalidation confirmation back to the update server 316. The invalidation confirmation may include the object identifier of the object that was invalidated.

At some later time after the object has been removed from the cache 310 at step 426 but prior to propagation of the updated object being complete (e.g., propagation of the updated object across the distributed database system may still be in progress), the client device 312 (or another client device) may send a request for the object to the requesting server 322 (or another requesting server). In response, the requesting server 322 may, at step 430, perform a cache check in the same manner as step 402 in an attempt to quickly retrieve the object. Because the object was invalidated, the cache 310 removed the object from the cache 310. As a result, the cache 310 may, at step 432, send, to the requesting server 322, an indication that the object is not stored in the cache 310 (e.g., a "Not Found" message) in a similar manner as step 404.

In response to receiving the indication that the object is not stored by the cache 310 (e.g., a "Not Found" message), the requesting server 322 may, at step 434, send a request for the object to one or more databases of the database cluster 308. In the example of FIG. 4, the request may be a GET command to retrieve the object as shown in step 434. The GET command may include the object's identifier. The database that receives the GET command may be determined based on load balancing performed by a device of the distributed database system 300 (e.g., such as another server). In this example, the database RO 320 receives the GET command from the requesting server 322. In response, the database RO 320 may look up the latest version of the object in its memory and return the latest version of the object to the requesting server 322 at step 436. In this instance, the latest version of the object stored by the database RO 320 may still be version 0 since the update to the object might not have yet propagated to the database RO 320. As a result, the object received by the requesting server 322 may be a stale, outdated version of the object.

After the requesting server 322 receives the stale, outdated version of the object, the requesting server 322 may, at step 438, assign a TTL value to the stale, outdated version of the object and store the assigned TTL and the stale, outdated version of the object at the cache 310 via a PUT command. The requesting server 322 may store the stale, outdated version of the object at the cache 310 because the requesting server 322 might not be aware that the object is stale. The cache 310 may be configured to remove the object from the cache 310 after a time period defined by the assigned TTL value has expired. The TTL value may be for example 2 weeks, a month, a year, etc. The cache 310 may, at step 440, return a confirmation of the storage to the requesting server 322. Additionally, the requesting server 322 may service the client device's 312 request for example by forwarding the stale, outdated version of the object to the client device 312.

Subsequent to storage of the stale, outdated version of the object by the cache 310, the database RO 320 may be updated via replication caused by the database RW 318 at step 442. Although the database RW 318 may begin replication of the updated object to each of the other databases upon being updated by the update server 316, there may be a lag time before a particular database such as the database RO 320 is updated. In this instance, the database RO 320 might not have been updated with the updated object (version 1) until after the stale, outdated version of the object (version 0) was added to the cache 310 at step 438.

Because the requesting servers are configured to attempt to retrieve the object from the cache prior to retrieving the object from the databases, an issue may arise if, later, the requesting server 322 (or another requesting server) wishes to obtain the object since the requesting server 322 may first check the cache 310, which may return the stale, outdated version of the object. Because the requesting server 322 was able to obtain the object from the cache 310 and the requesting server 322 might not be aware the object is stale, the requesting server 322 might not retrieve the object from the database RO 320, which now includes the updated version of the object.

In order to prevent this issue from arising, the requesting server 322 may, after sending the object to the cache 310 for storage in step 444, consult the RUO manager 324 to determine whether the object the requesting server 322 stored at the cache 310 may be at risk of being stale. The consultation of step 444 may be performed in the same manner as step 414. For instance, at step 444, the requesting server 322 may send, to the RUO manager 324, a request for an indication with the object has been updated recently enough to be at risk of being stale, which may be based on its RUO TTL value. The request may include the object identifier.

The RUO manager 324 may determine whether the object identifier matches any of the object identifiers listed in the RUO manager 324. If the object identifier does not match any object identifier listed in the RUO manager 324, the RUO manager 324 may send, to the requesting server 322, a response indicating that the object has not been updated recently enough to be at risk of being stale (e.g., since its RUO TTL has expired). The response may include the object identifier and an indication that the object identifier is not included in the list of object identifiers for recently updated objects and, thus, the object might not be invalidated (e.g., may be maintained) at the cache 310 since the object is not stale. As an example, the RUO manager 324 may return a "False" message as shown in step 416.

However, in the example depicted in FIG. 4, the object identifier may match one of the object identifiers listed in the RUO manager 324. Thus, the RUO manager 324 may, at step 446, send, to the requesting server 322, a response indicating that the object has been updated recently enough to be at risk of being stale (e.g., since its RUO TTL has not expired). The response may include the object identifier and an indication that the object identifier is included in the list of object identifiers for recently updated objects and, thus should be invalidated at the cache 310 since the object may be stale. As an example, the RUO manager 324 may return a "True" message. In some instances, the message may include the object identifier.

In response to receiving the "True" message, the requesting server 322 may, at step 448, invalidate the object stored in the cache 310. As an example, the requesting server 322 may send, to the cache 310, an invalidation command with the object's identifier (e.g., an instruction to remove the object from the cache 310). The cache 310 may then invalidate the object by removing the object from the cache 310. In this instance, the stale, outdated version of the object is removed from the cache 310. After invalidation is complete, the cache 310 may, at step 450, send, to the requesting server 322, a confirmation that the object has been invalidated. As an example, the cache 310 may send an "Entry Invalid" message that indicates that the object has been invalidated. In some cases, the message may include object's identifier.

If the requesting server 322 again (or another requesting server) attempts to retrieve the object from the cache 310, the cache 310 might not find the object and, thus, the requesting server 322 may again retrieve a copy of the object from the database RO 320. However, in this next instance, the database RO 320 may include the updated version of the object and the requesting server 322 may receive the updated version of the object, which the requesting server 322 may store in the cache 310 and use to service the client device's 312 request. The requesting server 322 may again check the RUO manager 324 to determine if the object has been updated recently enough to be at risk of being stale. In this instance, since the object is not at risk of being stale since its RUO TTL has expired, the requesting server 322 might not send the invalidation command to the cache 310 (e.g., the requesting server 322 may maintain storage of the object at the cache 310).

As an example, where the updated object is stored in the cache 310 but its RUO TTL has not yet expired, the requesting server 322 may send, to the cache 310, an invalidation command to remove the object from the cache 310 since the object is at risk of being stale. While the invalidation command may cause the updated version of the object to be removed from the cache 310, after the object is added to the cache 310 and its corresponding RUO TTL has expired (e.g., the object is no longer considered recently updated), the object might not be invalidated (e.g., may be maintained) since the requesting server 322 knows that the object is up-to-date as the object's identifier is not included in the list of object identifiers for recently updated objects maintained by the RUO manager 324.

As discussed above, replication (e.g., propagation) of an updated object across the distributed database system 300 may take a variable amount of lag time for each database in the distributed database system 300. By consulting the RUO manager 324 after reading an object from the cache 310 or after the storing the object at the cache 310, the requesting servers 322 may continually invalidate objects at the cache 310 that have been updated recently enough to be at risk of being stale, which eventually results in consistency across the data center 302. Because updates to the RUO manager 324 may propagate to RUO managers of the other data centers, the distributed database system 300 may eventually reach consistency for the object upon expiration of its RUO TTL since the RUO TTL is based on how long the update should take to propagate across the distributed database system 300 and because the stale, outdated version of the object is continually removed from the caches of the distributed database system 300.

Figure 5:
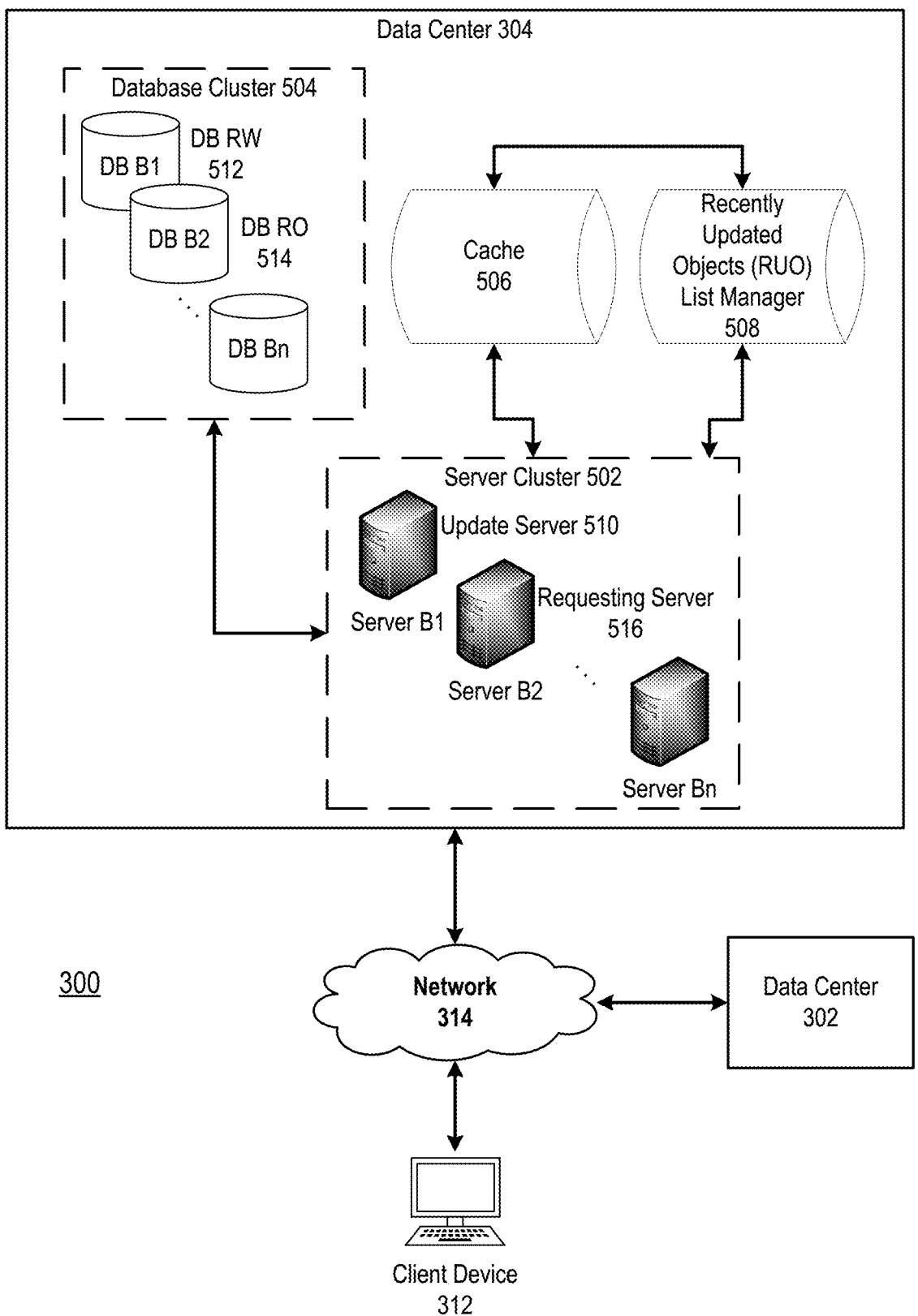
FIG. 5 depicts another view of the eventually-consistent distributed database system of FIG. 3.

While the above message flow of FIG. 4 has been described with respect to computing devices stored in the same data center (e.g., data center 302), functionality of the caches, databases, and RUO managers may extend to other data centers (e.g., data center 304). FIG. 5 depicts another view of the distributed database system of FIG. 3. As shown in FIG. 5, the data center 304 may include a server cluster 502 including one or more servers (e.g., an update server 510, a requesting server 516, etc.), which may have the same components and functionality as the servers of the data center 302. The data center 304 may also include a database cluster 504 including one or more databases (e.g., a master database RW 512, a slave database RO 514), which may be replicas of the databases of data center 302 and include the same components and functionality. Additionally, the data center 304 may include its own cache 506 and its own RUO manager 508, which may be replicas of the cache 310 and the RUO manager 324, respectively. Further, the cache 506 and the RUO manager 508 may have the same components and functionality as the cache 310 and the RUO manager 324, respectively.

Figure 6:
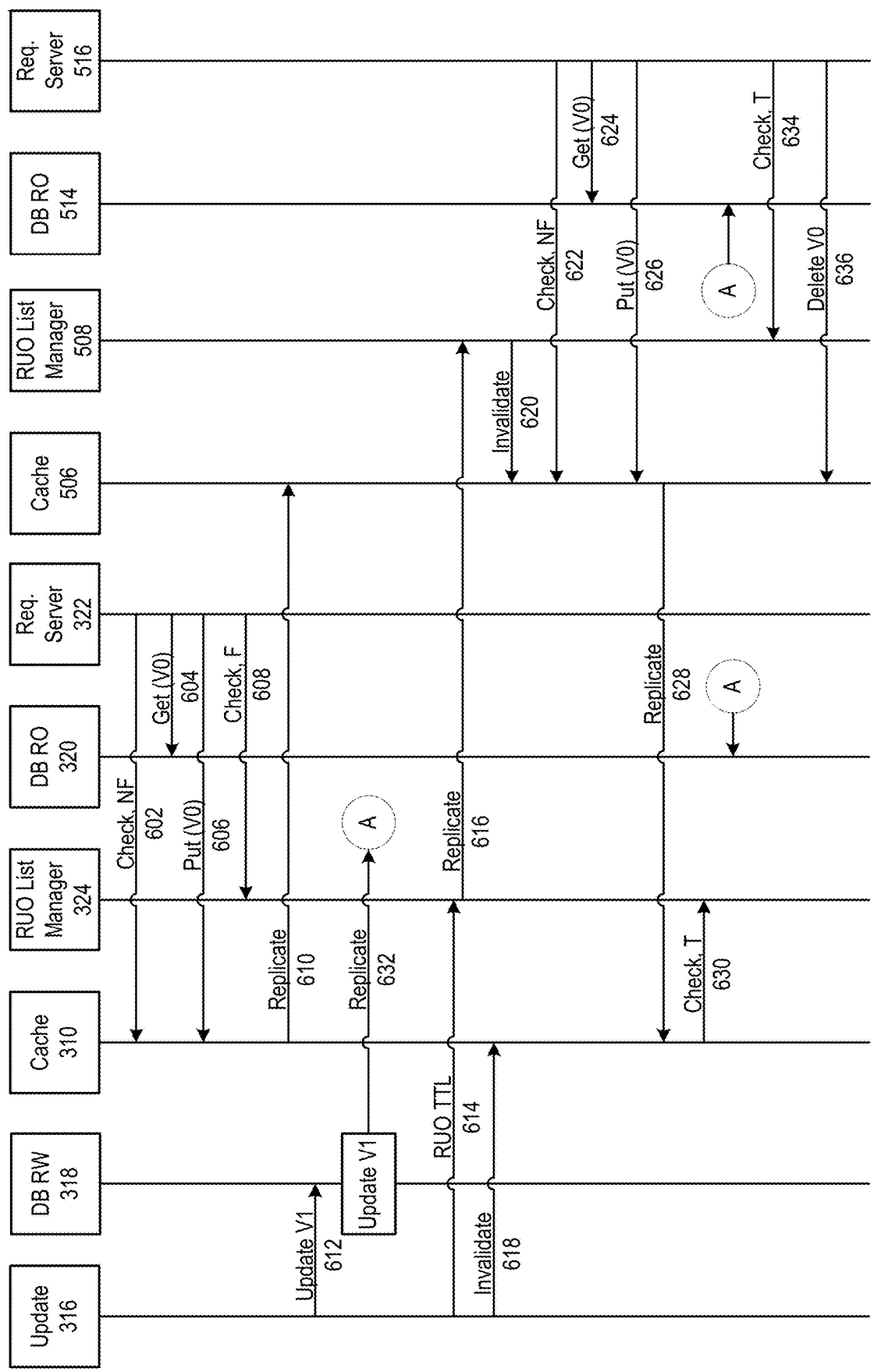
FIG. 6 depicts an example message flow for an eventually-consistent distributed database system.

FIG. 6 depicts an example message flow for an eventually-consistent distributed database system with the functionality of FIG. 4 extending across multiple data centers. In some cases, the steps of FIG. 6 may be performed in response to the requesting server 322 receiving a request for an object from the client device 312.

In FIG. 6, certain steps are not illustrated for the sake of brevity. For instance, cache check returns similar to those described in steps 404 and 432 are not shown. Additionally, various confirmations (e.g., storage confirmations, update confirmations) similar to those shown in steps 412, 420, 428, and 440 are not shown. Returns of GET commands similar to those shown in steps 408 and 436 are not shown. Returns associated with RUO functions similar to those shown in steps 416, 424, 446, and 450 are not shown. However, in describing FIG. 6, such steps will be briefly described.

Steps 602-608 of FIG. 6 may be performed in the same manner as steps 402-416 of FIG. 4.

For instance, at step 602, the requesting server 322 may check the cache 310 and, in response, receive a "Not Found" (NF) message. Because the requesting device 322 has been unable to retrieve the object from the cache 310, the requesting device 322 may, at step 604, send a request for the object to the database RO 320 and, in response, receive the object from the database RO 320, which may be the most up-to-date version of the object stored by the database RO 320. The requesting server 322 may, at step 606, store the object in the cache 310 with a TTL value.

Because each server in the distributed database system 300 may be configured to consult the RUO manager after retrieving an object from a cache or after the storing the object at a cache, the requesting server 322 may, at step 608, send, to the RUO manager 324, a request for an indication whether the object may be at risk of being stale, which may be based on its RUO TTL value, if any. The request may include the object identifier of the object that the requesting server 322 just stored in the cache 310. The RUO manager 324 may determine whether the object identifier matches any of the object identifiers in the list of object identifiers for recently updated objects maintained by the RUO manager 324. If so, the RUO manager 324 may send, to the requesting server 322, a response indicating that the object has been updated recently enough to be at risk of being stale, which may be based on its RUO TTL value and, thus, should be invalidated at the cache 310. As an example, the RUO manager 324 may return a "True" message. Otherwise, if the object identifier does not match any object identifier included in the list of object identifiers for recently updated objects maintained by the RUO manager 324, the RUO manager 324 may send, to the requesting server 322, a response indicating that the object has not been updated recently enough to be at risk of being stale and, thus, the object may be maintained (e.g., not invalidated) at the cache 310. As an example, the RUO manager 324 may return a "False" (F) message as shown in step 608.

Each of the caches in the distributed database system 300 may be configured to propagate (e.g., replicate) updates to the other caches of the distributed database system 300. Thus, upon storing the object received from the requesting server 322, the cache 310 may, at step 610, immediately begin replicating the object by sending the object, the object's identifier, and its TTL value to the other caches of other data centers such as the cache 506 of data center 304. At this point, the cache 506 may also store a copy of the object, the object's identifier, and its TTL value and may forward the update to caches of other data centers. While step 610 is shown after step 608, step 610 may be performed prior to or at the same time as step 608.

At some later time, the update server 316 may, at step 612, update the object in the database RW 318 and, in response, receive an update successful confirmation message from the database RW 318 in the same manner as discussed in steps 418 and 420 of FIG. 4. In response to the update, the database RW 318 may, at step 632, begin propagation (e.g., replication) of the updated object to the distributed database system 300 as will be explained in further detail below.

After successfully updating the object in the database RW 318, the update server 316 may, at step 614, determine a RUO TTL value for the recently updated object and send, to the RUO manager 324, an update notification including an object identifier of the recently updated object and the determined RUO TTL value for storage. As discussed above, the RUO manager 324 may maintain a list of object identifiers of recently updated objects, which the requesting server 322 or the cache 310 may consult to determine whether to invalidate an object in the cache 310. If the object's identifier is included in the list, the object may be invalidated in the cache 310. If the object's identifier is not included in the list, the object might not be invalidated in the cache 310 on this basis but the object may be removed after its TTL for storage in the cache 310 expires. Additionally, the RUO manager 324 may be configured to remove an object identifier from the list of object identifiers stored in the RUO manager 324 after its RUO TTL expires. After the RUO TTL value and the object identifier of the recently updated object have been stored in the RUO manager 324, the RUO manager 324 may send a successful storage confirmation back to the update server 316. In some cases, the confirmation may include the object identifier. After storing the object identifier and the corresponding RUO TTL value at the RUO manager 324, the update server 316 may, at step 618, invalidate the object stored at the cache 310 and, in response, receive an invalidation confirmation, which may be performed in the same manner as discussed above in steps 426 and 428 of FIG. 4.

Each of the RUO managers in the distributed database system 300 may be configured to propagate updates to the other RUO managers of the distributed database system 300. Thus, upon storing the object's identifier and the object's RUO TTL value, the RUO manager 324 may, at step 616, immediately begin replicating the object identifier and corresponding RUO TTL value by sending them to each of the other RUO managers of other data centers such as the RUO manager 508 of data center 304. At this point, the RUO manager 508 may also store a copy of the object identifier and the corresponding RUO TTL value.

After the RUO manager 508 receives the update notification (e.g., the object identifier and corresponding RUO TTL value) from the RUO manager 324, the RUO manager 508 may, at step 620, invalidate the object stored in the cache 506. For example, the RUO manager 324 may send, to the cache 506, a command to invalidate the object. The command may include the object identifier of the object. Invalidation may include removing and/or otherwise deleting the object from the cache 506. After the cache 506 has invalidated the object, the cache 506 may send an invalidation confirmation back to the RUO manager 508. The invalidation confirmation may include an identifier of the object that was invalidated. While the step 616 is depicted as occurring prior to the step 618, in some instances, step 618 may occur prior to or at the same time as step 616.

Subsequent to the invalidation of step 620, the requesting server 516 of the data center 304 may wish to obtain the object for example to service a request by another client device 312. As discussed above, the servers of the distributed database system 300 may be configured to, prior to retrieving an object from a local database, attempt to retrieve the object from the local cache. Thus, at step 622, the requesting server 516 may check whether the object is stored by the local cache 506. For instance, the requesting server 516 may send a GET command with the object's identifier to the cache 506. In response, the cache 506 may check its memory to determine whether the cache 506 has a stored copy of the object. If so, the cache 506 may return, to the requesting server 516, a copy of the most recent version of the object stored by the cache 506. In such cases, the requesting server 516 may service the client device's 312 request for example by forwarding the object to the client device 312. Otherwise, if the cache 506 determines that the object is not stored by the cache 506, then the cache 506 may return, to the requesting server 516, an indication that the object is not stored by the cache 506. As an example, the cache 506 may return a "Not Found" (NF) message indicating that the object has not found by the cache 506. In the example depicted FIG. 6, the object has been previously removed from the cache 506. As a result, the cache 506 may return a "Not Found" message to the requesting server 324.

In response to receiving the indication that the object is not stored by the cache 506 (e.g., the "Not Found" message), the requesting server 516 may, at step 624, send a request for the object to the database cluster 604. In the example of FIG. 6, the request may be a GET command to retrieve the object as shown in step 624. The GET command may include the object's identifier. The database that receives the GET command may be determined based on load balancing performed by a device of the distributed database system 300 (e.g., such as another server). In this example, database RO 514 receives the GET command from the requesting server 516. In response, the database RO 514 may look up the latest version of the object in its memory and return the latest version of the object to the requesting server 516. In this instance, the latest version of the object stored by the database RO 514 may be version 0, which may be the stale, outdated version of the object since an update to the object in the database RW 318 occurred earlier at step 612 and that update has not yet propagated to the database RO 514 (e.g., the update may still be in progress).

After the requesting server 516 receives the stale, outdated version of the object, the requesting server 516 may, at step 626, assign the stale, outdated object a time-to-live (TTL) value and store the stale, outdated object along with the TTL value at the cache 506 since the requesting server 516 might not know that the object is stale. As an example, the requesting server 516 may send, to the cache 506, a PUT command with the object, the object's identifier, and its assigned TTL value. The cache 506 may be configured to remove the object from the cache 506 after a time period defined by the assigned TTL value has expired. The TTL value may be for example 2 weeks, a month, a year, etc. The object's TTL value stored at the cache 506 may be different than the object's RUO TTL value. The cache 506 may return a confirmation of the storage to the requesting server 516. At this point, the requesting server 322 may service the client device's 312 request for example by forwarding the stale, outdated version of the object to the client device 312.

After the stale, outdated version of the object is stored at the cache 506, the cache 506 may, at step 628, propagate or replicate a copy of the stale, outdated version of the object to other caches of other data centers. For example, the cache 506 may send, to the cache 310 of the data center 302, a PUT command including the object, object's identifier, and its TTL value.

Caches of the distributed database system 300 may be configured to consult with the RUO managers in response to receiving an object propagated from another cache. Thus, in response to receiving the object from the cache 506, the cache 310 may, at step 630, consult the RUO manager 324 to determine whether the received object has been updated recently enough to be at risk of being stale. For instance, the cache 310 may send, to the RUO manager 324, a request for an indication whether the object has been updated recently enough to be at risk of being stale. The request may include the object's identifier.

The RUO manager 324 may determine whether the object's identifier is included in the list of object identifiers for recently updated objects. If not, the RUO manager 324 may return a "False" (F) message to the cache 310, which indicates that the object's identifier does not match any object identifier in the RUO manager 324 (e.g., a response indicating that the object has not been updated recently enough to be at risk of being stale) and, thus, might not be invalidated. The "False" message may include the object's identifier. The object's identifier may be removed from the RUO manager 324 after its RUO TTL expires. "False" messages and "Not Found" messages may be used interchangeably herein. Otherwise, if the object's identifier is currently listed in the RUO manager 324, the RUO manager 324 may return a "True" (T) message to the cache 310, which indicates that the object's identifier is currently stored in the RUO manager 324 (e.g., a response indicating that the object has been updated recently enough to be at risk of being stale) and, thus, may be invalidated. In the example depicted in FIG. 6, the cache 310 may receive a "True" message at step 630. In response, the cache 310 may remove the object that was recently stored by the cache 310 and propagated from the cache 506.

After the object stored at the database RW 318 was updated at step 612, the database RW 318 may have begun, at step 632, the propagation process. For instance, the database RW 318 may send the updated object to each of the slave databases (e.g., the database RO 320) of the data center 302. Additionally, the database RW 318 may send the updated object to the master databases of other data centers, which, in turn, send the updated object to each of their corresponding slave databases. As an example, the database RW 318 may send the updated object to the master database RW 512, which may, in turn, send the updated object to the slave database RO 514.

In this instance, the database RO 514 might not have been updated until after the stale, outdated version of the object has again been added to the cache 506 in step 626, which occurred after the invalidation of step 620. As result, although the database RO 514 now stores the updated version of the object, the cache 506 may store the stale, outdated version of the object.

The requesting servers may be configured to consult the RUO managers after either reading an object from the local cache or after storing an object at the local cache. In the example depicted in FIG. 6, because the requesting server 516 stored the object at the cache 506 in step 626, the requesting server 516 may, at step 634, consult the RUO manager 508 to determine if the object the requesting server 516 just stored at the cache 506 has been updated recently enough to be at risk of being stale. The consultation may be performed after the storing the object at the cache 506 (e.g., after a PUT command) in order to account for scenario where the database RO 514 is updated after the PUT command and prior to the consultation as shown in FIG. 6.

In performing the consultation, the requesting server 516 may send, to the RUO manager 508, a request for an indication whether the object just stored at the cache 506 has been updated recently enough to be at risk of being stale. The request may include the object identifier. The RUO manager 508 may determine whether the object identifier matches any of the object identifiers included in the list of object identifiers for recently updated objects. If the object identifier does not match any object identifier included in the list, the RUO manager 508 may send, to the requesting server 516, a response indicating that the object has not been updated recently enough to be at risk of being stale (e.g., an indication that the object identifier is not in the list) and, thus, the object may be maintained (e.g., not invalidated) at the cache 506 since the object is not stale. As an example, the RUO manager 508 may return a "False" message. However, in the example depicted in FIG. 6, the object identifier may match with one of the object identifiers in the list. Thus, the RUO manager 508 may send, to the requesting server 516, a response indicating that the object has been updated recently enough to be at risk of being stale (e.g., an indication that the object identifier is in the list) and, thus, should be invalidated at the cache 506. As an example, the RUO manager 508 may return a "True" (T) message. In some instances, the message may include the object identifier.

In response to receiving the response indicating that the object has been updated recently enough to be at risk of being stale (e.g., the "True" message), the requesting server 516 may, at step 636, invalidate the object stored at the cache 506. As an example, the requesting server 516 may send, to the cache 506, an invalidation command with the object's identifier (e.g., an instruction to remove the object from the cache 506). The cache 506 may then invalidate the object by removing the object from the cache 506. As a result, the stale, outdated version of the object may be removed from the cache 506. After invalidation has been completed, the cache 506 may send, to the requesting server 516, a confirmation that the object has been invalidated. As an example, the cache 506 may send an "Entry invalid" message that indicates that the object has been invalidated. In some cases, the message may include object's identifier.

If the requesting server 516 later attempts to retrieve the object from the cache 506, the cache 506 might not find the object and, thus, the requesting server 516 may again retrieve the object from the database RO 514 (or another database based on load balancing). However, in this instance, the database RO 514 may include the updated version of the object and the requesting server 516 may receive the updated version of the object, which the requesting server 516 may store at the cache 506 and use to service client devices' 312 requests. Additionally, the requesting server 516 may again check the RUO manager 508 to see if the object has been recently updated. If not, the requesting server 516 might not send the invalidation command to the cache 506. However, if the object has been recently updated (e.g., its RUO TTL has not yet expired), the requesting server 516 may send, to the cache 506, an invalidation command to remove the object from the cache 506. While the invalidation command may cause the updated version of the object to be removed from the cache 506, after the object is added to the cache 506 and its corresponding RUO TTL has expired (e.g., the object is no longer considered updated enough to be at risk of being stale), the object might not be invalidated since the requesting server 516 has determined that the object is up-to-date since it is not included in the list.

As discussed above, propagation (e.g., replication) of an update object across the distributed database system 300 may take a variable amount of lag time for each database in the distributed database system 300. By consulting RUO managers after reading the object from the cache 506 or after the storing the object at the cache 506, the requesting servers 616 may continually invalidate objects in the cache 506 that have been updated recently enough to be at risk of being stale, which eventually results in consistency across the data center 304. Because updates to the RUO manager 508 may propagate to RUO managers of the other data centers, the distributed database system 300 may eventually reach consistency for the object upon expiration of its RUO TTL since the RUO TTL is based on how long the update should take to propagate across the distributed database system 300 and because the stale, outdated version of the object is continually removed from the caches of the distributed database system 300.

While the steps of FIGS. 4 and 6 are shown in a particular order, steps may be rearranged and performed in a different order or at the same time. In some cases, some steps may be omitted. As an example, confirmation steps may be omitted. Further, any of the steps may be repeated. For instance, the steps may be repeated for a second update to the object, third update to the object, and so on. For instance, the steps may be repeated for an update to a different object such as a second object, a third object, and so on. For instance, the steps may be repeated to extend the functionalities described herein to additional data centers such as a third data center, a fourth data center, and so on.

In some cases, if a requesting server (e.g., the requesting server 322) receives an indication from the RUO manager that an object has been updated recently enough to be at risk of being stale, the requesting server may still service the request of the client device with that object. Additionally, the requesting server 322 may periodically consult the RUO manager (e.g., after waiting a preset amount of time) to determine if the object is still at risk of being stale. After the requesting server 322 receives an indication that the object is no longer at risk of being stale, the requesting server may again retrieve the object from the cache or a database and update its service with the object (e.g., by sending the object to the client device 312).

In some cases, a requesting server may consult a RUO manager prior to placing or storing the object at the cache. As an example, the requesting server may send, to the RUO manager, a request for an indication whether the object has been updated recently enough to be at risk of being stale. In response to receiving a response indicating that the object has not been updated recently enough to be at risk of being stale, the requesting server may store the object at the cache. Otherwise, in response to receiving a response indication that the object has been updated recently enough to be at risk of being stale, the requesting sever might not store the object at the cache and may invalidate any copies of the object at the cache.

By using the system and methodologies described herein, a distributed database system may maintain eventual consistency across each of its databases and caches. Such a distributed database system may be equipped to handle media data services where an object is frequently updated in its first hour of life and then rarely updated thereafter. However, the distributed database system may also handle a variety different object types and sources for those objects, such as, for example, social network messaging objects. In such cases, the distributed database system 300 may receive, from those sources, a RUO TTL as a parameter.

The descriptions above are merely examples of various concepts. They may be rearranged/divided/combined as desired, and one or more components or steps may be added or removed without departing from the spirit of the present disclosure. The scope of this patent should only be determined by the claims that follow.

The invention claimed is:

1. An apparatus comprising:
one or more processors; and
memory storing instructions that, when executed by the one or more processors, cause the apparatus to:
send, to a computing device, a request for an indication of whether an object is outdated or at risk of being outdated, wherein the object is associated with a duration value indicating a duration to store the object at a cache;
receive, from the computing device, a response indicating that the object is outdated or at risk of being outdated; and
after receiving the response indicating that the object is outdated or at risk of being outdated, cause removal of the object from the cache.

2. The apparatus of claim 1, wherein the instructions, when executed by the one or more processors, further cause the apparatus to:
receive, from the computing device, an indication that a second object is outdated or at risk of being outdated; and
cause removal of the second object from the cache.

3. The apparatus of claim 1, wherein the instructions, when executed by the one or more processors, further cause the apparatus to:
receive, from the computing device, an indication that a second object is not outdated or at risk of being outdated; and after receiving the indication that the second object is not outdated or at risk of being outdated, maintain storage of the second object at the cache.

4. The apparatus of claim 1, wherein the response indicating that the object is outdated or at risk of being outdated is based on a second duration value associated with the object and different from the duration value, and wherein the second duration value is based on a predicted time to propagate an update of the object across each of a plurality of databases of a distributed database system.

5. The apparatus of claim 4, wherein the duration value is at least two weeks and the second duration value is less than 15 minutes.

6. The apparatus of claim 1, wherein the instructions, when executed by the one or more processors, further cause the apparatus to:
  receive an object identifier of a second object and a time-to-live (TTL) value of the object identifier; and
  cause, based on the object identifier of the second object and the TTL value of the object identifier, removal of the second object from the cache.

7. The apparatus of claim 1, wherein the instructions, when executed by the one or more processors, further cause the apparatus to:
  receive an update to a second object; and
  after receiving the update to the second object, send, to the computing device, a request for an indication of whether the second object is outdated or at risk of being outdated.

8. The apparatus of claim 1, wherein the instructions, when executed by the one or more processors, further cause the apparatus to:
  send, to the computing device and based on an update to the object, an object identifier of the object and a second duration value different from the duration value; and
  cause removal of the object from the cache.

9. The apparatus of claim 1, wherein the instructions, when executed by the one or more processors, further cause the apparatus to:
  send, to the cache, a second object and a second duration value indicating a duration to store the second object at the cache; and
  after sending the second object and after receiving an indication from the computing device that the second object is outdated, cause removal of the second object from the cache.

10. The apparatus of claim 1, wherein the instructions, when executed by the one or more processors, further cause the apparatus to:
  send, to the cache and before sending the request for the indication, at least one of:
    the object,
    the duration value, or
    an object identifier of the object.

11. The apparatus of claim 1, wherein the instructions, when executed by the one or more processors, further cause the apparatus to:
  retrieve, from the cache and before sending the request for the indication, the object.

12. The apparatus of claim 1, wherein the instructions, when executed by the one or more processors, further cause the apparatus to:
  cause, based on the response indicating that the object is outdated or at risk of being outdated, removal of the object from each cache of a plurality of caches.

13. The apparatus of claim 1, wherein the response indicating that the object is outdated or at risk of being outdated is based on one or more of: an indication that an object identifier for the object is on a list of recently updated objects, or a second duration value indicating a duration to store the object identifier on the list of recently updated objects.

14. The apparatus of claim 1, wherein the instructions, when executed, cause the apparatus to:
  send, to the computing device, the request for an indication by sending, to the computing device and via a network, the request; and
  receive, from the computing device, the response indication by receiving, from the computing device and via the network, the response.

15. One or more non-transitory computer readable media storing instructions that, when executed, cause:
  sending, to a computing device, a request for an indication of whether an object is outdated or at risk of being outdated, wherein the object is associated with a duration value indicating a duration to store the object at a cache;
  receiving, from the computing device, a response indicating that the object is outdated or at risk of being outdated; and
  after receiving the response indicating that the object is outdated or at risk of being outdated, causing removal of the object from the cache.

16. The one or more non-transitory computer readable media of claim 15, wherein the instructions, when executed, further cause:
  receiving, from the computing device, an indication that a second object is outdated or at risk of being outdated; and
  causing removal of the second object from the cache.

17. The one or more non-transitory computer readable media of claim 15, wherein the instructions, when executed, further cause:
  receiving, from the computing device, an indication that a second object is not outdated or at risk of being outdated; and
  after receiving the indication that the second object is not outdated or at risk of being outdated, maintaining storage of the second object at the cache.

18. The one or more non-transitory computer readable media of claim 15, wherein the response indicating that the object is outdated or at risk of being outdated is based on a second duration value associated with the object and different from the duration value, and wherein the second duration value is based on a predicted time to propagate an update of the object across each of a plurality of databases of a distributed database system.

19. The one or more non-transitory computer readable media of claim 18, wherein the duration value is at least two weeks and the second duration value is less than 15 minutes.

20. The one or more non-transitory computer readable media of claim 15, wherein the instructions, when executed, further cause:
  receiving an object identifier of a second object and a time-to-live (TTL) value of the object identifier; and
  causing, based on the object identifier of the second object and the TTL value of the object identifier, removal of the second object from the cache.

21. The one or more non-transitory computer readable media of claim 15, wherein the instructions, when executed, further cause:
  receiving an update to a second object; and after receiving the update to the second object, sending, to the computing device, a request for an indication of whether the second object is outdated or at risk of being outdated.

22. The one or more non-transitory computer readable media of claim 15, wherein the instructions, when executed, further cause:
sending, to the computing device and based on an update to the object, an object identifier of the object and a second duration value different from the duration value; and
causing removal of the object from the cache.

23. The one or more non-transitory computer readable media of claim 15, wherein the instructions, when executed, further cause:
sending, to the cache, a second object and a second duration value indicating a duration to store the second object at the cache; and
after sending the second object and after receiving an indication from the computing device that the second object is outdated, causing removal of the second object from the cache.

24. The one or more non-transitory computer readable media of claim 15, wherein the instructions, when executed, further cause:
sending, to the cache and before the sending the request for the indication, at least one of:
the object,
the duration value, or
an object identifier of the object.

25. The one or more non-transitory computer readable media of claim 15, wherein the instructions, when executed, further cause:
retrieving, from the cache and before sending the request for the indication, the object.

26. The one or more non-transitory computer readable media of claim 15, wherein the instructions, when executed, further cause:
causing, based on the response indicating that the object is outdated or at risk of being outdated, removal of the object from each cache of a plurality of caches.

27. The one or more non-transitory computer readable media of claim 15, wherein the response indicating that the object is outdated or at risk of being outdated is based on one or more of: an indication that an object identifier for the object is on a list of recently updated objects, or a second duration value indicating a duration to store the object identifier on the list of recently updated objects.

28. An apparatus comprising:
one or more processors; and
memory storing instructions that, when executed by the one or more processors, cause the apparatus to:
send, to a cache, an object and a duration value indicating a duration to store the object at the cache;
send, to a computing device, a request for an indication of whether the object is outdated or at risk of being outdated;
receive, from the computing device, a response indicating that the object is not outdated and is not at risk of being outdated; and
after receiving the response indicating that the object is not outdated and is not at risk of being outdated, maintain storage of the object at the cache.

29. The apparatus of claim 28, wherein the instructions, when executed by the one or more processors, further cause the apparatus to:
send, to the cache, a second object and a second duration value indicating a duration to store the second object at the cache; and
after sending the second object and after receiving an indication from the computing device that the second object is not outdated and is not at risk of being outdated, maintain storage of the second object at the cache.

30. The apparatus of claim 28, wherein the instructions, when executed by the one or more processors, further cause the apparatus to:
retrieve, from the cache, a second object associated with a second duration value indicating a duration to store the second object at the cache; and
after retrieving the second object and after receiving an indication from the computing device that the second object is not outdated and is not at risk of being outdated, maintain storage of the second object at the cache.

31. The apparatus of claim 28, wherein the response indicating that the object is not outdated and is not at risk of being outdated is based on a second duration value associated with the object and different from the duration value, and wherein the second duration value is based on a predicted time to propagate an update of the object across each of a plurality of databases of a distributed database system.

32. The apparatus of claim 28, wherein the instructions, when executed by the one or more processors, further cause the apparatus to:
receive an object identifier of a second object and a time-to-live (TTL) value of the object identifier; and
after receiving the object identifier of the second object and the TTL value of the object identifier, cause removal of the second object from the cache.

33. The apparatus of claim 28, wherein the instructions, when executed by the one or more processors, further cause the apparatus to:
receive an update to a second object; and
after receiving the update to the second object, send, to the computing device, a request for an indication of whether the second object is outdated or is at risk of being outdated.

34. One or more non-transitory computer readable media storing instructions that, when executed, cause:
sending, to a cache, an object and a duration value indicating a duration to store the object at the cache;
sending, to a computing device, a request for an indication of whether the object is outdated or at risk of being outdated;
receiving, from the computing device, a response indicating that the object is not outdated and is not at risk of being outdated; and
after receiving the response indicating that the object is not outdated and is not at risk of being outdated, maintaining storage of the object at the cache.

35. The one or more non-transitory computer readable media of claim 34, wherein the instructions, when executed, further cause:
sending, to the cache, a second object and a second duration value indicating a duration to store the second object at the cache; and
after sending the second object and after receiving an indication from the computing device that the second object is not outdated and is not at risk of being outdated, maintaining storage of the second object at the cache.

36. The one or more non-transitory computer readable media of claim 34, wherein the instructions, when executed, further cause:
   retrieving, from the cache, a second object associated with a second duration value indicating a duration to store the second object at the cache; and
   after retrieving the second object and after receiving an indication from the computing device that the second object is not outdated and is not at risk of being outdated, maintaining storage of the second object at the cache.

37. The one or more non-transitory computer readable media of claim 34, wherein the response indicating that the object is not outdated and is not at risk of being outdated is based on a second duration value associated with the object and different from the duration value, and wherein the second duration value is based on a predicted time to propagate an update of the object across each of a plurality of databases of a distributed database system.

38. The one or more non-transitory computer readable media of claim 34, wherein the instructions, when executed, further cause:
   receiving an object identifier of a second object and a time-to-live (TTL) value of the object identifier; and
   after receiving the object identifier of the second object and the TTL value of the object identifier, causing removal of the second object from the cache.

39. The one or more non-transitory computer readable media of claim 34, wherein the instructions, when executed, further cause:
   receiving an update to a second object; and
   after receiving the update to the second object, sending, to the computing device, a request for an indication of whether the second object is outdated or is at risk of being outdated.

* * * * *

UNITED STATES PATENT AND TRADEMARK OFFICE
CERTIFICATE OF CORRECTION

| | | |
|---|---|---|
| PATENT NO. | : 11,494,314 B2 | |
| APPLICATION NO. | : 17/124201 | |
| DATED | : November 8, 2022 | |
| INVENTOR(S) | : Orogvany et al. | |

It is certified that error appears in the above-identified patent and that said Letters Patent is hereby corrected as shown below:

In the Specification

Column 6, Detailed Description, Line 23:
Delete "in in" and insert --in-- therefor Column 20, Detailed Description, Line 49:
After "FIG. 4.", delete "¶" therefor Column 22, Detailed Description, Line 55:
Delete "324." and insert --322.-- therefor Column 25, Detailed Description, Line 38:
Delete "616" and insert --516-- therefor Signed and Sealed this
Twenty-sixth Day of December, 2023

Katherine Kelly Vidal
*Director of the United States Patent and Trademark Office*